United States Patent [19]

Timmons

[11] 4,321,670

[45] Mar. 23, 1982

[54] METHOD OF MERGING INFORMATION ON STORAGE MEDIA

[75] Inventor: John P. Timmons, White Plains, N.Y.

[73] Assignee: Schlumberger Technology Corporation, New York, N.Y.

[21] Appl. No.: 758,263

[22] Filed: Jan. 10, 1977

Related U.S. Application Data

[63] Continuation-in-part of Ser. No. 600,763, Jul. 31, 1975, abandoned.

[51] Int. Cl.³ .......................... G06F 7/22; G06F 9/00; G06F 15/00
[52] U.S. Cl. ................................................... 364/300
[58] Field of Search ... 364/200 MS File, 900 MS File, 364/300; 360/13

[56] References Cited

U.S. PATENT DOCUMENTS

| | | | |
|---|---|---|---|
| 2,947,976 | 8/1960 | Mendelson et al. | 364/900 |
| 3,017,610 | 1/1962 | Auerback et al. | 364/900 |
| 3,428,946 | 2/1969 | Batcher | 364/900 |
| 3,540,000 | 11/1970 | Bencher | 364/200 |
| 3,696,343 | 10/1972 | Schloss | 364/900 |

OTHER PUBLICATIONS

Digital Computer User's Handbook, "Sorting & Merging", 1967, Goetz, pp.1-292-1320.
"Sorting", W. T. Letty from Proceeding of the 3rd Austrailian Computer Conference, 1967.
"Some Improvements in the Technology of String Merging & Internal Sorting", M. A. Goetz, vol. 25, from 64 Joint Comp. Conf.

Primary Examiner—Raulfe B. Zache
Assistant Examiner—John G. Mills
Attorney, Agent, or Firm—Stephen L. Borst; Martin Novack

[57] ABSTRACT

A method of merging and rewriting information contained in related data records recorded on first and second sections or files of storage media. (Typically, the "sections" may be individual magnetic tapes.) In accordance with the invention there is provided the step of reading the data records recorded on the first section and rewriting the data records in alternating relationship with dummy data records on a third section of storage media. Related data records recorded on the second section and the third section are read and the information contained therein is merged. The merged information is then written onto the dummy data records on the third section of storage media to obtain merged data records therein. The procedure is repeated sequentially for each related pair of data records on the sections of storage media under consideration. In the preferred embodiment of the invention, inter-record gaps are provided between adjacent written records and the dummy data records are made of sufficient length to hold the merged information for a pair of related data records plus an additional safety gap length. In accordance with a further embodiment of the invention, the merging operation can be performed using only a single tape transport in situations where the data to be merged is obtained on a "real time" basis, such as data obtained in real time at a well logging site.

14 Claims, 8 Drawing Figures

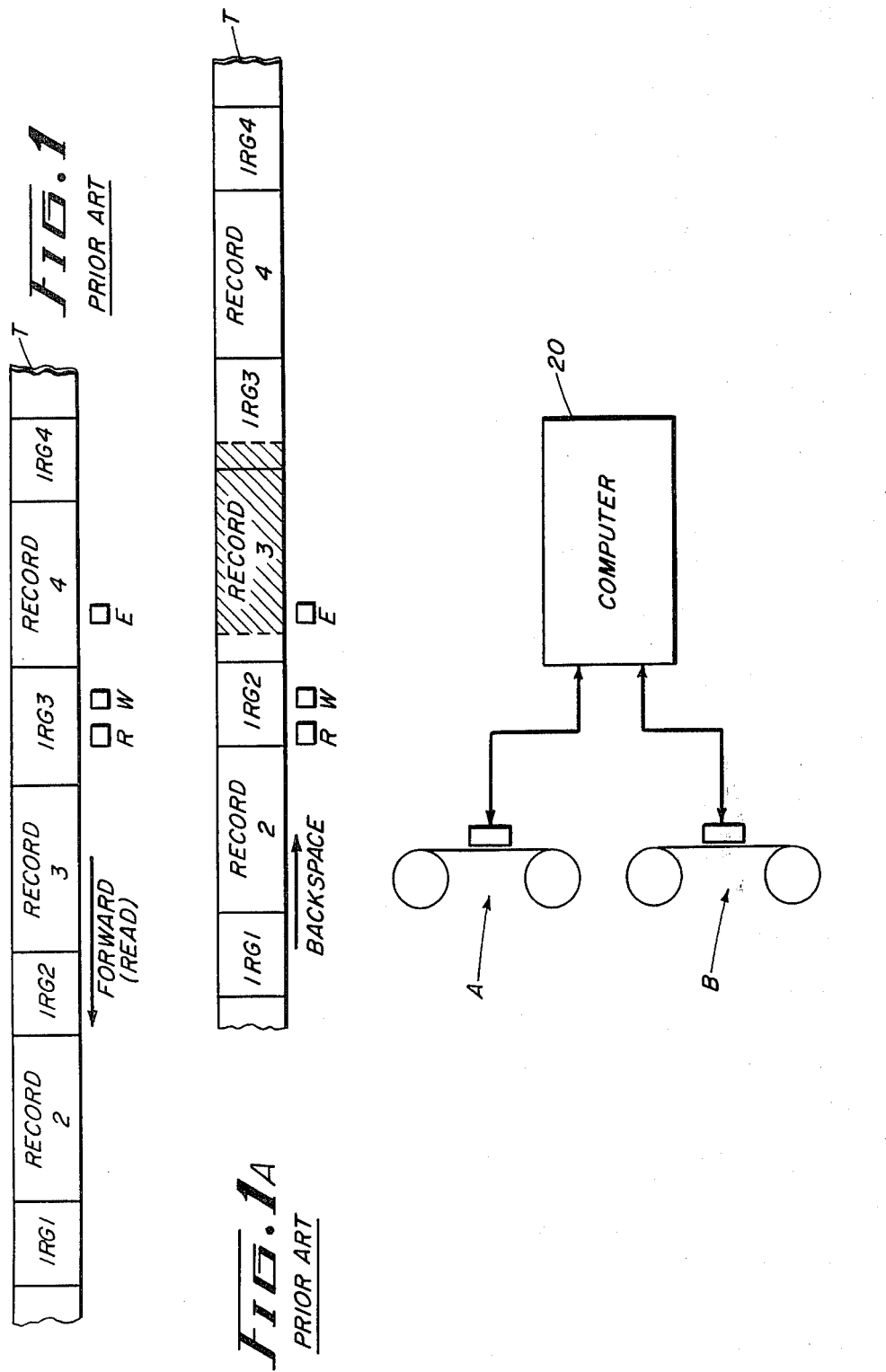

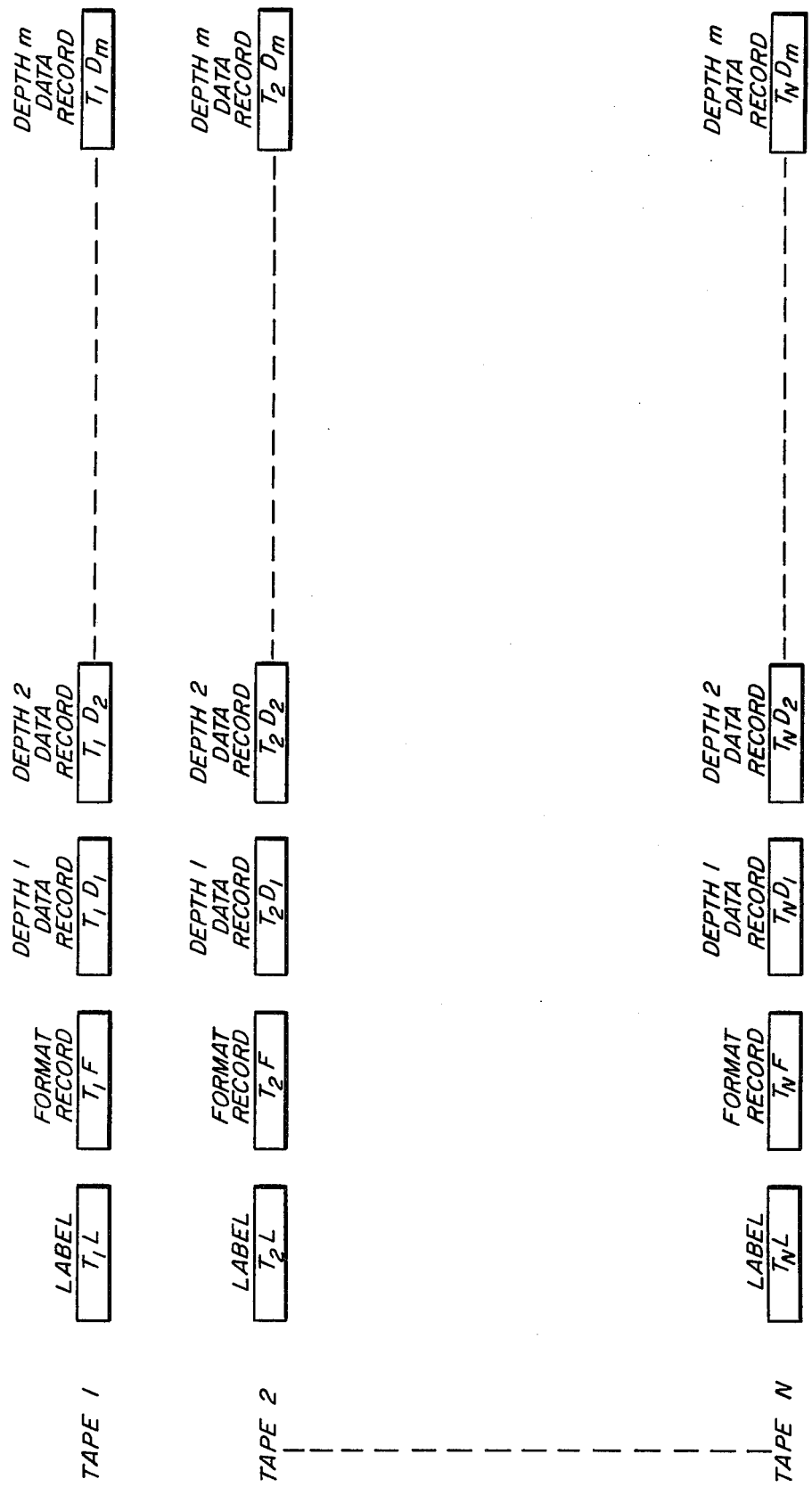

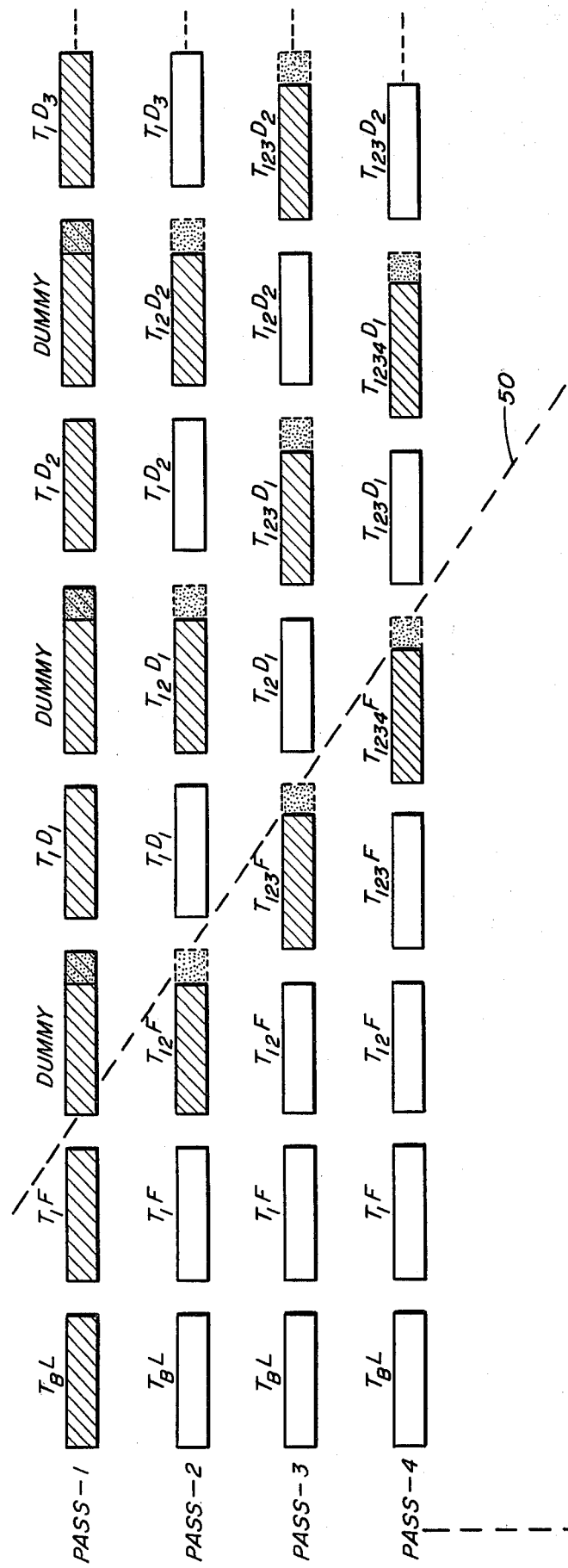

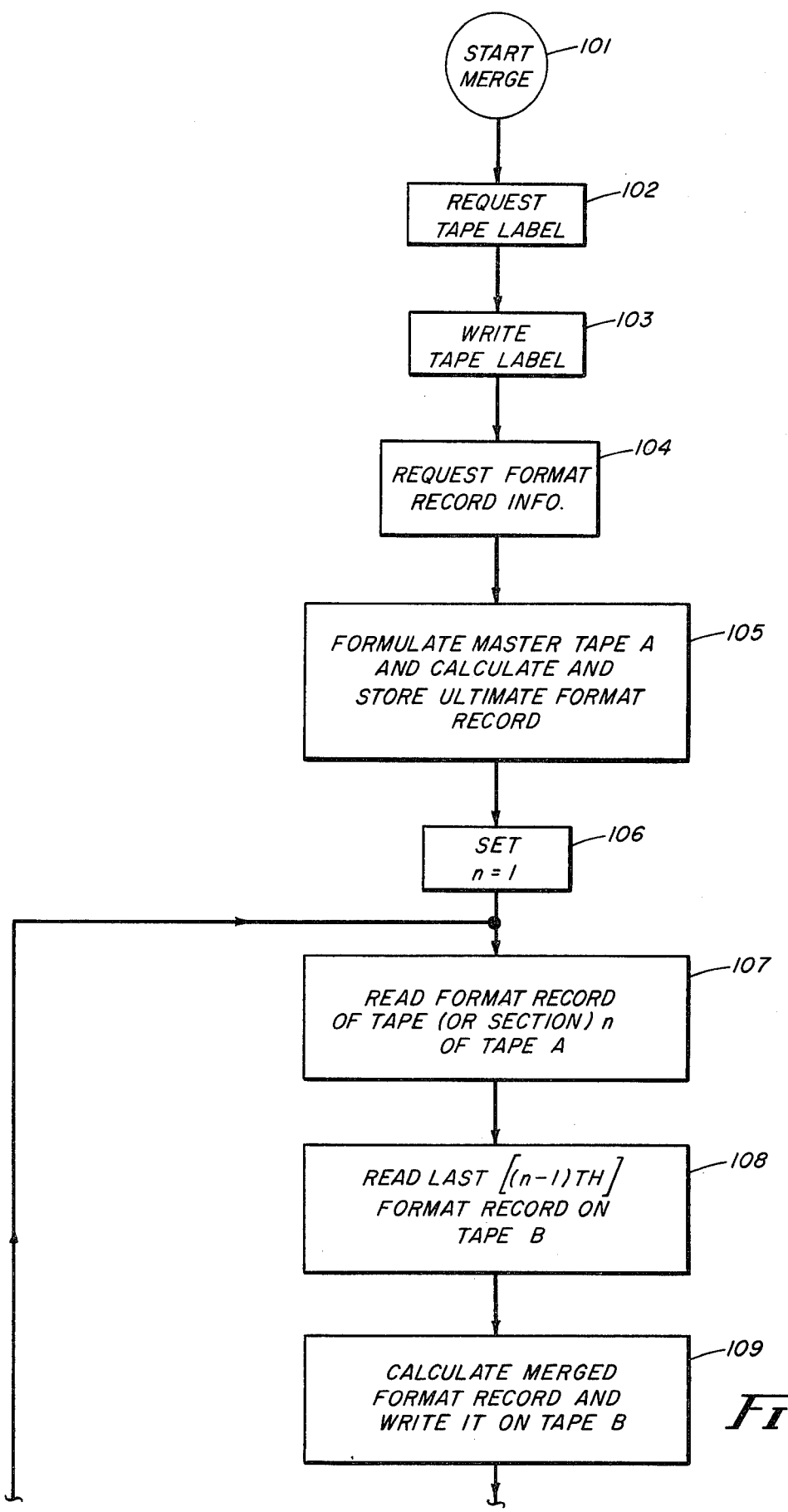

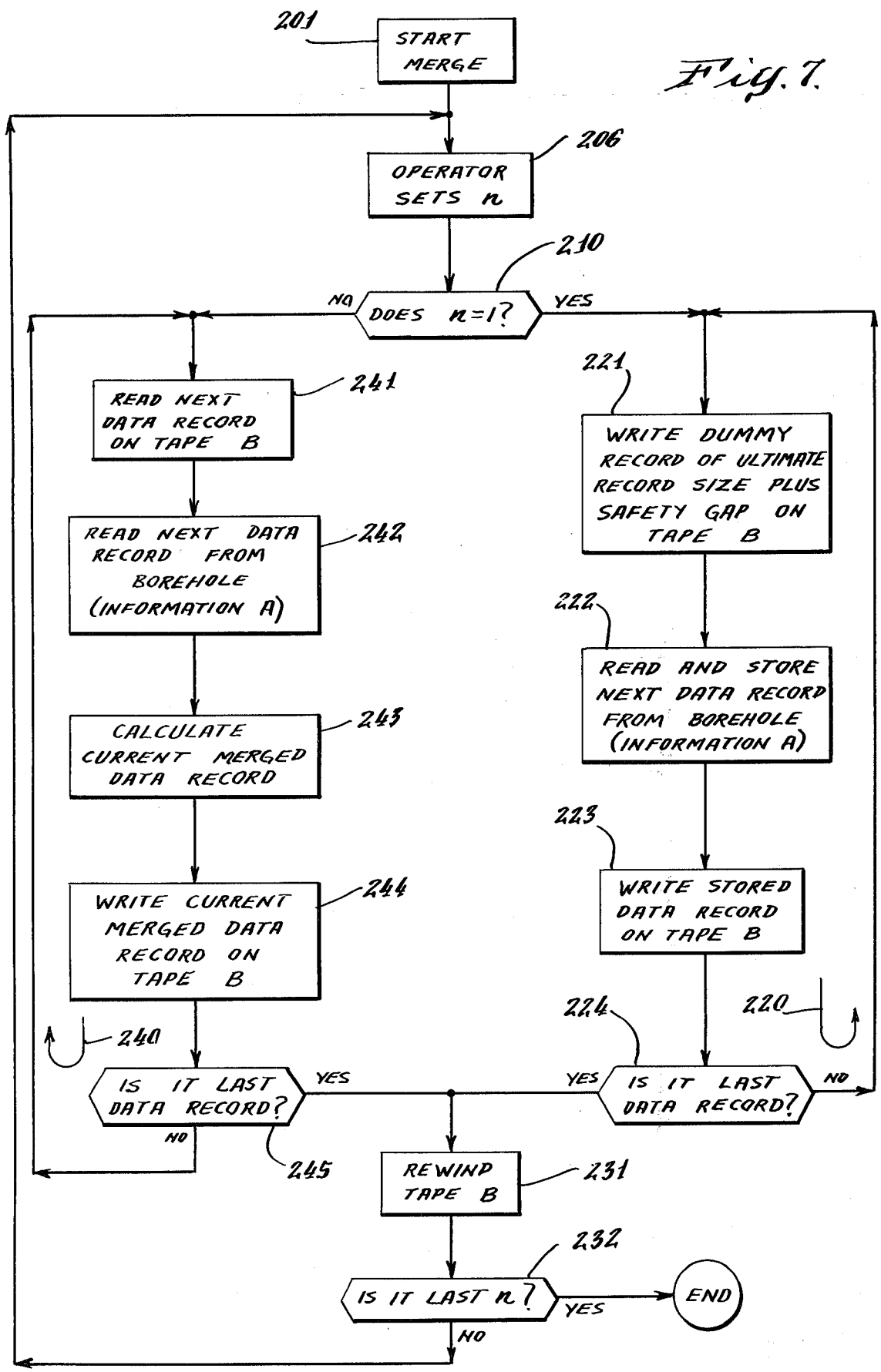

METHOD OF MERGING INFORMATION ON STORAGE MEDIA

BACKGROUND OF THE INVENTION

This is a continuation-in-part of U.S. Application Ser. No. 600,763 filed July 31, 1975, now abandoned. This invention relates to data storage techniques and, more particularly, to a method for reading, merging, and writing data on storage media such as magnetic tape.

For various applications employing magnetic tapes it is necessary to read information contained in related data records on two or more different tapes, merge the information in the related data records, and rewrite the new merged data record. This operation would typically be performed in sequence for each related pair or group of data records on the two or more tapes.

For example, assume that five tapes having related data records are to be merged; i.e., one composite (ultimate) tape is to be formed having a plurality of merged data records, each merged data record containing all of the data in related data records on all five tapes. Stated another way, assume that tape 1 includes data records $A_1$, $B_1$, $C_1$ . . . $Z_1$, tape 2 includes data records $A_2$, $B_2$, $C_2$ . . . $Z_2$, tape 3 includes data records $A_3$, $B_3$, $C_3$ . . . $Z_3$, and so on, with data records $A_1$, $A_2$ . . . $A_5$ being related, data records $B_1$, $B_2$ . . . $B_5$ being related, etc. The composite tape to be formed will have merged data records designated $A_{12345}$, $B_{12345}$, . . . $Z_{12345}$, where data record $A_{12345}$ includes all the data originally in data records $A_1$, $A_2$ . . . $A_5$, data record $B_{12345}$ includes all the data originally in data records $B_1$, $B_2$ . . . $B_5$, and so on. If three tape drives are available, the following technique can be used to obtain the composite tape: Tape 1 and tape 2 are mounted on two of the tape drives and a blank tape on the third tape drive. Data records $A_1$ and $A_2$ are read into memory of an available computer that forms the merged data record $A_{12}$ which is then written on the blank tape. Data records $B_1$ and $B_2$ are then read, merged to form $B_{12}$, and written on the blank tape, and the same is done for all remaining related data records on tapes 1 and 2. For the next "run" the following tapes would be mounted on the three tape drives: the "combined" (1,2) tape from the first run, tape 3, and a blank tape. Data records $A_{12}$ and $A_3$ are read from the combined tape and tape 3, respectively, and merged to form data record $A_{123}$ which is written on the blank tape. Merged data records $B_{123}$, $C_{123}$ . . . $Z_{123}$ are formed and written on the blank tape. In similar fashion, after two more runs, the composite tape containing the merged data records $A_{12345}$, $B_{12345}$, . . . $Z_{12345}$ can be formed.

When only two tape drive are available, as is the case in various practical situations, an alternate known merging technique can be utilized. Specifically, two tapes to be combined are mounted on the two tape drives and the two related data records to be merged are read into the computer and their data is merged. One of the tapes is then backed up to the beginning of the data record previously read and the merged data record is written over the previously read data records. During the next run, a third tape to be combined is used along with the previously combined tape which is again written over using the same technique to obtain merged data records from the combined three tapes. The procedure is continued for all tapes to be combined.

The stated technique has a number of disadvantages. First of all, attempts at updating or rewriting new data records over old data records give rise to problems imposed by the electrical and mechanical limitations of most tape drive systems. FIGS. 1 and 1A illustrate the problem which arises in an updating or rewriting situation.

In FIG. 1, the magnetic tape medium (T) is moved to the left in order to read RECORD 3 and then is automatically stopped so as to position the read (R), write (W), and erase (E) heads in the illustrated position. Next, a backspace command reverses the tape in the direction of the arrow so as to stop the R, W and E heads substantially in the position illustrated in FIG. 1A. Then, a write command is effective to write new information into the RECORD 3 area. However, the problem of "forward creep" causes the updated information to be shifted to the right as illustrated by the shaded portion in FIG. 1A. "Forward creep" is a cumulative problem since repetitive updating of information in RECORD 3 causes the entire RECORD 3 to successively step to the right and this movement eventually will destroy the information in RECORD 4 either by writing directly over it or by erasing it with the erase head. Accordingly, the sequence of a backspace followed by a write operation is a problematic sequence of commands and, in the past, its use has been generally ineffective to selectively and repeatedly update specified record areas.

The physical explanation for this "forward creep" phenomenon is based on the electrical and mechanical characteristics of the tape drive system operative to move the magnetic tape in relationship to the R, W, and E heads. Under a backspace-write sequence of commands, tape drive systems are designed to possess an inherent dynamic time lag between the time the magnetic tape begins to move and the time at which the W head becomes energized to commence writing information on the magnetic tape. This dynamic time delay, $t_1$, is designed into the system in order to insure that the W head does not begin writing information into a preceding record area after a backspace command. For example, after the backspace command illustrated in FIG. 1A, the time lag insures that the W head is not over the unselected RECORD 2 so as to result in the erroneous destruction of information therein. This is contrasted to other tape commands wherein a tape is successively moving in a given direction, for example, write-write, read-write, write tape mark-write, and thus the write head is always positioned beyond the previously accessed record area. As a result, systems are designed to initiate the execution of successive commands within a shorter time period than $t_1$ because it is unnecessary to safeguard against the write head being over the previously accessed record area.

A further disadvantage of the described prior technique for merging related data records on two tapes where only two tape drives are available is that the technique is destructive of previously recorded merged information when this prior merged information is written over with the latest merged information. For example, assume that a number of runs have been successively performed and a further run is now being performed to merge the data records of a last tape with the previously merged information on a latest combined tape. Now, if an error is made in the rewriting process, the latest combined tape will be effectively destroyed since it will have been partially written over. In such case, it will be necessary to start the entire procedure over from the first run, rather than merely reperforming the latest run. Of course, various alternate techniques, such as making and utilizing duplicate tapes, can be employed, but these involve wasteful time consuming operations.

A proposed situation to the problem of "forward creep" is disclosed in U.S. Pat. No. 3,740,720 wherein there is described a technique for backspacing an additional amount beyond the point at which rewriting is to take place and then reading up to the appropriate point before beginning the rewriting operation. In this manner, read-write command sequences replace the proscribed backspace-write command sequences. While the technique described in the referenced patent appears to overcome a specific problem, it involves extra operations and, also, it does not offer solution to the indicated problem of destructive rewriting over merged information which necessitates starting over when an error is encountered.

It is accordingly one of the objects of the present invention to provide a technique for merging and rewriting information non-destructively in a situation where only two tape drives are available, the technique of the invention also solving the problem of "forward creep". It is a further object of the invention to provide a technique for merging related data records in sequentially received groups of information (such as groups of data records obtained during different passes by a well logging tool in a borehole) using only a single tape transport.

SUMMARY OF THE INVENTION

A first embodiment of the present invention is directed to a method of merging and rewriting information contained in related data records recorded on first and second sections or files of storage media. (Typically, the "sections" may be individual magnetic tapes.) In accordance with the invention there is provided the step of reading the data records recorded on the first section and rewriting the data records in alternating relationship with dummy data records on a third section of storage media. Related data records recorded on the second section and the third section, respectively, are read and the information contained therein is merged. The merged information is then written onto the dummy data records on the third section of storage media to obtain merged data records therein. The procedure is repeated sequentially for each related pair of data records on the sections of storage media under consideration. In the preferred form of this embodiment, inter-record gaps are provided between adjacent written records and the dummy data records are made of sufficient length to hold the merged information for a pair of related data records plus an additional safety gap length.

More particularly, the first embodiment of the invention is directed to a method of merging, and non-destructively rewriting on a given section of storage tape (e.g. magnetic tape) mounted on a first tape drive subsystem, information contained in related data records recorded on a plurality of sections of storage tape mountable on a second tape drive subsystem, the method requiring the use of only two tape drive subsystems. Data records recorded on the first of the plurality of sections of storage tape are read and sequentially written in alternating relationship with dummy data records on the given section of storage tape. The given section of storage tape is then rewound. The next steps comprise reading a pair of related data records respectively recorded on the next of the plurality of sections of storage tape and the given section of storage tape and merging the information therein; and then writing the merged information onto a dummy data record on the given section of storage tape to obtain a current merged data record therein. These two steps are then repeated for other pairs of related data records. The given section of storage tape is then again rewound. A pair of related data records, one of which is recorded on the next of the plurality of sections of storage tape and the other of which is in the last-recorded merged data records on the given section of storage tape, are then read and merged; and this latest merged information is then written into the given section of storage tape as a current merged data record, the current merged data record occupying a position between last-recorded merged data records. These last two steps are then repeated for other pairs of related data records and the same technique is utilized for each remaining of the plurality of sections of storage tape.

In accordance with a second embodiment of the invention, the merging operation can be performed using only a single tape transport, such as in situations where the data records to be merged are obtained on a "real time" basis, for example data records obtained at a well logging site (or communicated from a well logging site), the data records being taken over a particular range of depth levels in a borehole. Briefly, the procedure may be as follows: A first pass of a well logging tool is taken over a particular range of depth levels. Data records, for example one data record for each depth level in the range, are recorded on a fresh tape. The data records taken during each pass are referred to generically as a "sequence" of data records. During this first pass, dummy data records are recorded in alternating relationship with the data records from successive depth levels. (For operation in "real time", it is assumed that sufficient time is available between successive measurements to advance the tape to obtain the alternately recorded data records during the first pass or, as will be seen, to perform the merging and writing of data records during subsequent passes.) After completion of the first pass, the tape is rewound and, typically, preparation is made for obtaining additional data records from depth levels in the same particular range of depth levels. This may be done, for example, by lowering a different logging tool back to the beginning of the range of interest and then logging again over the range (logging generally being done as a logging tool is raised in the borehole) while taking measurements with the logging tool. It is not necessary that the same entire particular range of depth levels be logged during each subsequent pass, but this embodiment of the invention is generally applicable to a situation where at least a portion of the depth levels in the particular range are logged a plurality of times and, for ease of explanation, it is assumed that the same range of depth levels is logged during each pass.

In this embodiment of the invention, the second sequence of data records, obtained during the second pass, are processed as follows: A data record is obtained in real time from the borehole and a related data record (taken previously at the same depth level) is read from the tape. Either of these operations can be performed first or, depending upon the capabilities of available computer or logic circuitry, the operations can be performed at the same time. The information in the related data records is merged and written in the dummy data record which immediately follows the data record just read from the tape. This is then repeated for all data records so that the related data records from the first and second sequences (or passes) of data records are merged. The tape is then rewound and the procedure again followed for a third pass (i.e., a third sequence of data records taken over the particular depth range) with each merged data record being written over the oldest data records, as described above in conjunction with the first embodiment (wherein the sources of the data records were previously recorded sections of magnetic tape).

In the application where only a single tape transport is needed to obtain a merged tape, i.e. where the original source of data records is not from a local second tape transport, an available local second tape transport can be utilized to record an archival tape of the latest pass in the borehole while the first-mentioned tape transport is generating the merged tape in the described manner. Accordingly, where two tape transports are available, the merged tape can be obtained essentially in "real time" while still producing an archival tape which provides a record of the data taken during the particular pass.

Further features and advantages of the invention will become more readily apparent from the following detailed description when taken in conjunction with the accompanying drawings.

BRIEF DESCRIPTION OF THE DRAWINGS

FIGS. 1 and 1A are schematic representations of a magnetic tape and heads and illustrates a problem of the prior art.

FIG. 2 shows a setup which can be utilized for practicing the method of the first embodiment of the present invention.

FIG. 3 is a simplified representation of the type of information contained on N different tapes recorded during a well-logging operation.

FIG. 4 is a representation of the information recorded on tape B during the various passes used in obtaining the desired composite tape having the fully merged information.

FIGS. 5A and 5B, when placed one below another, is a simplified flow diagram for use in implementing a computer to perform at least part of the method in accordance with the first embodiment of the invention.

FIG. 7 is a simplified flow diagram for use in implementing a computer to perform at least part of the method in accordance with the second embodiment of the invention.

DESCRIPTION OF THE PREFERRED EMBODIMENT

Figure 5B:
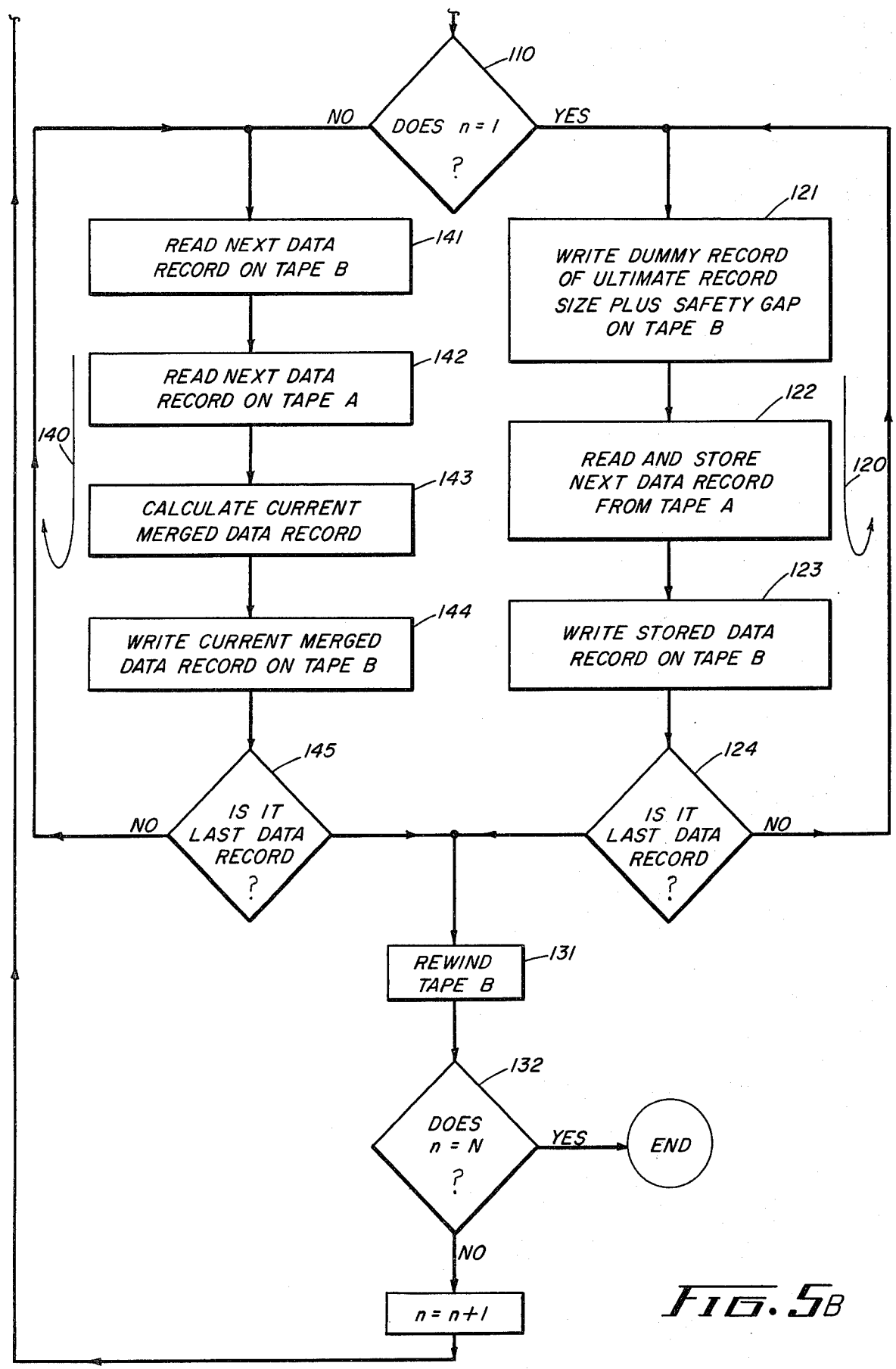

Referring to FIG. 2, there is shown an arrangement utilizing two tape drives labeled by reference letters A and B and a computer 20. In the embodiments of the invention the computer 20 performs the function of controlling operation of the tape drives as well as receiving information therefrom, merging information, and feeding information thereto. However, it will be understood that at least some of the steps of the invented method could, if desired, be performed manually, semi-automatically or by any suitable means, not necessarily a computer. For purposes of describing the first embodiment it will be assumed that the data records on the tapes to be merged contain well logging information; i.e., data taken by a logging tool at various depths of a borehole. Typically, well logging data is taken in the field by an operator having a truck with limited equipment thereon. A modern well logging truck includes a minicomputer and two tape drives. Accordingly, the first embodiment of the invention applies particularly well to this situation, although it should be emphasized that the principles of the invention are applicable to various other types of data and circumstance.

Referring to FIG. 3, there is shown a simplified representation of the type of information contained on N different tapes recorded during a well logging operation. For ease of explanation, it is assumed that each tape was recorded during a "pass" of a logging tool over a specific range of depth levels. In a practical situation the tapes might typically contain information taken over different ranges of depth levels, although the tapes under consideration will contain at least some information about corresponding depth levels; i.e., the depth levels will overlap to some degree. Also, the information on tapes 1, 2 . . . N might be recorded sequentially on one or more long tapes. As will be understood, however, the invention can be readily applied to any of these situations and the simplifying assumptions are convenient in facilitating description of the invention.

In FIG. 3 it is seen that each tape contains a number of record areas which are separated in conventional fashion by inter-record gaps. Each record area is designated by a pair of capital letters, some of which have subscripts. The first letter is a T whose subscript indicates the tape number on which the particular record is contained, for example, all records on tape 1 including the designation $T_1$. The second capital letter indicates the type of record and, in the case of data records, identifies the particular data record on the tape in question. For example, on tape 1 the tape label is designated by $T_1L$, the format record is designated by $T_1F$, and the respective data records are designated by $T_1D_1$, $T_1D_2$ . . . $T_1D_m$, where there are m data records involved. Similar designations are utilized for the remaining tapes, tape 2 through tape N, as is seen in FIG. 3. The tape label contains the usual identification information for the tape in question. The format record describes the format of the data records to follow which, in this case, are assumed to contain well logging data taken at a series of discrete depth levels from depth 1 through depth m. Typically, the format record will contain information regarding the number of words per data record, the coded meaning of the words, and the like. As stated, for ease of explanation the data records on each tape are assumed to be successively related to information recorded at successive depth levels designated by the numerals 1 through m. The object is to merge the information in related data records, i.e., the data records taken at the same depth levels, and generate an output tape containing the merged data records. (It should be noted that the term "related data records" is intended generically to mean data records which are associated in some prescribed manner—e.g. by depth level in the present illustration.) For example, the data records at depth level 1 on the N tapes are $T_dD_1$, $T_2D_1$ . . . $T_ND_1$, and the data record obtained by merging these related data records shall be designated $T_{1,2...N}D_1$. In accordance with the first embodiment of the invention, this objective is achieved with only two tape drives and in the non-destructive manner to be described. Also, the problem of "forward creep" is overcome.

Preliminary to proceeding with the method of the first embodiment, it is useful and convenient to utilize the setup of FIG. 2 to make a single long "master" tape which includes the contents of the N tapes of FIG. 3 in sequence. In making this "master" tape, a blank tape can be mounted on tape drive A and tapes 1 through N are sequentially run on tape drive B and rerecorded on the blank tape on tape drive A to form the master tape. During this preliminary operation the computer 20 can read the various format records and calculate for future use, the size of the ultimate record (format or data) required for the fully merged information. Depending on the type of format utilized, the ultimate record size may be equal in size to the individual data records on the tapes 1 through N (which may all be of the same size or different sizes), or it may be larger than any one of them. Typically, the individual data records on the tapes 1 through N will include "empty" word spaces, so the ultimate data record size may be of the same size as the data records on the master tape, the ultimate data record having less empty words than the original data records. However, it will become apparent that these details do not effect operation in accordance with the invention so long as the ultimate data record size is available for use in the manner to be described.

The completed master tape on tape drive A is rewound and a blank tape, which is to ultimately carry the merged information, is mounted on tape drive B. For convenience, these two tapes will be hereinafter referred to as "tape A" and "tape B".

Referring to FIG. 4, there is shown a diagram of the information recorded on tape B during the N passes over tape B which are used in obtaining the desired composite tape having the fully merged information. During pass-1, a tape label is first written onto tape B, the label being given the designation $T_BL$, and then the format record for tape B is recorded. The format record recorded for tape B during this pass is merely $T_1F$, which is the same as the format record of tape 1 (FIG. 3). The tape label and the format record are separated by an interrecord gap and, in all cases, an inter-record gap will be conventionally recorded between consecutive records on the tape, with extra gaps occasionally being provided in accordance with the invention as will be set forth. In FIG. 4, standard inter-record gaps are indicated by blank spaces and extra "safety" gaps are indicated by dotted portions. Also, records written on tape B during a particular pass are shown with cross hatching whereas records written during a previous pass (sometimes referred to as last-recorded records) are shown without cross hatching. During pass-1 the data records from tape 1 are recorded on tape B in alternating relationship with "dummy" data records (e.g., "empty" records consisting of only zeros), the dummy data records being of the previously calculated ultimate record size plus an additional safety gap length, as is seen in FIG. 4. Accordingly, it is seen that the data records $T_1D_1$, $T_1D_2$, etc. are recorded between dummy records of the stated size. The data records from tape 1 are assumed to be of ultimate record size, but if not, they can be extended by appropriate adding of zeros.

At the completion of pass-1 tape B is rewound and tape A, which is at the end of its tape 1 portion (the information from its tape 1 portion having now been recorded on tape B) need not be rewound. During pass 2, the data records from tape 1 (now recorded on tape B as per pass-1) and the related data records from tape 2, which is the next section of the master tape A, are merged and recorded on tape B. The tape label and the previously recorded format record ($T_1F$) are read from tape B. The format record is read from tape A (tape 2) and the merged format record, designated $T_{12}F$, is written on tape B over the dummy record. Since the dummy record is of ultimate record size plus a safety gap length, and since the newly written record cannot be longer than the ultimate record size, the merged format record $T_{12}F$ fits within the dummy record and the safety gap insures against the possibility of writing into the next record. The data record $T_1D_1$ is then read from tape B and the data record $T_2D_1$ is read from tape A and their contents are merged by the computer. The resultant merged data is written over the next dummy record on tape B as data record $T_{12}D_1$, as illustrated in FIG. 4. Again, the merged data record fits within the dummy record and the safety gap insures against the possibility of writing into the next record. During the remainder of pass-2 the rest of the related data records are merged and written in the described manner.

At the completion of pass-2 tape B is again rewound and tape A will be at the beginning of its tape 3 portion. With further reference to FIG. 4, the tape label and the two previously recorded format records, $T_1F$ and $T_{12}F$, are read. Also, the format record from tape 3, viz. $T_3F$, is read from tape A. The format records $T_{12}F$ and $T_3F$ are merged by the computer and the resultant is written on tape B as merged format record $T_{123}F$. The newly written format record is begun one standard record gap after the previously read record ($T_{12}F$) and is seen to be written over the data record $T_1D_1$ which had been written during pass one. A "safety" gap is accordingly given rise to between the end of newly recorded record $T_{123}F$ and the next record on tape B, $T_{12}D_1$. This safety gap can be thought of as the one which had been part of the first dummy record written during pass-1, the safety gap now having "advanced" to its new position after the newly written record. The data records $T_{12}D_1$ and $T_3D_1$ are next read from tape B and tape A, respectively, and their data is merged by the computer. The resultant merged data is written on tape B as merged data record $T_{123}D_1$. Again, the newly written record (in this case a data record) is begun one standard record gap after the previously read record ($T_{12}D_1$) and is written over the data record $T_1D_2$ which had been written on tape B during pass-1. As before, a safety gap is given rise to between the end of the newly recorded record ($T_{123}D_1$) and the next record on tape B ($T_{12}D_2$).

During the remainder of pass-3 the rest of the related data records are merged and written in the described manner. It will be recognized that the safety gaps insure against writing into the next record and the described technique also "repositions" the safety gaps to an advantageous location for the next pass. It will be further recognized that the newly written records are written between last-recorded records (i.e., recorded during the last pass) and written over records which had been recorded two passes before. Therefore, the records recorded during the previous pass (e.g. the $T_{12}$ records for pass-3) are preserved. Accordingly, if an error is made in merging or writing merged information during a particular pass, the pass can be repeated without the necessity of restarting from pass-1. For example, assume that an error is made in writing the merged data record $T_{123}D_1$ during pass-3. In such case the data record $T_1D_2$, which was written over, is destroyed. However, none of the merged information from pass-2 (i.e., the $T_{12}$ records) are written over during pass-3, so it is not necessary to reformulate and rerecord the $T_{12}$ records. This is especially important during the later passes where starting over from scratch would be very wasteful of time.

The method described in conjunction with pass-3 of FIG. 4 is repeated as each of the N tapes are combined by having their related data records merged and written onto tape B. At the end of pass-N the tape B will have the fully merged data records designated $T_{123...N}D_1$, $T_{123...N}D_2,...T_{123...N}D_M$. In the FIG. 4 the diagonal line 50 separates the format records from the data records for each pass.

Referring to FIG. 5, there is shown a simplified flow diagram for use in implementing a digital computer to perform at least part of the method in accordance with the first embodiment of the invention. It will be understood, however, that activation of the tape drives and/or performance of other steps in accordance with the invented method need not be performed using a general purpose or special purpose computer, although such machines are most convenient for practicing the invention. The block 101 represents entrance into the "merge" routine and the blocks 102 and 103 are concerned with the application of an appropriate tape label on the blank tape B. The block 104 represents the computer request for format record information, and in this case the operator would supply such information as the number of data words or samples per depth level, etc. Block 105 represents the formulation of the master tape A in the manner described above; i.e., by just aggregating the tapes, tape 1, tape 2, . . . tape N, to form the master tape. Of course, with minor inconvenience the individual tapes or sections thereof could be utilized separately. As noted in block 105, during this operation the computer may calculate and store the ultimate record size, although there may be a preordained maximum record size as determined by the nature of the particular data system design.

The variable n, which represents the pass number or the particular tape number (or section) presently being dealt with on tape A, is set to unity (block 106). Subsequently, the format record of tape n (tape 1 in this instance) is read from tape A and the last format record (i.e. the (n-1)th format record) is read from tape B (this would be the 0th format record in this case since no format records are yet recorded on tape B), as indicated by the blocks 107 and 108. The merged format record (simply $T_1F$ for pass-1) is written on tape B (block 109). At this point, the decision block 110 determines if $n=1$ and, if so, the loop indicated by curved arrow 120 is entered. The loop 20 achieves the alternating dummy records and data records illustrated in pass 1 of FIG. 4. Specifically, a dummy record of ultimate record size plus a safety gap is written on tape B (block 121) and the next data record from tape A is read and stored (block 122). The stored data record is then written on tape B (block 123) and decision block 124 represents determination of whether it is the last data record on the section of tape on tape A being considered (tape 1), this determination being facilitated by a conventional "end of file" record at the end of each tape section on the master tape A. If it is not the last data record the block 121 is reentered and the procedure is continued until the last data record is reached. When this occurs, tape B is rewound (block 131) and the decision block 132 determines if the last pass has been performed. If not, n is incremented (block 133) and block 107 is reentered.

During the processing for pass-2, the blocks 107, 108 and 109 represent the functions of reading the format record $T_1F$ and the format record on tape 2 (of master tape A) and forming and writing the merged format record $T_{12}F$ on tape B, the writing operation conventionally leaving a standard record gap after the previously read record. Now, since $N=2$, the decision block 110 will cause entrance into the loop identified by curved arrow 140, this loop being used to perform the merging and writing operations for the remaining passes. Specifically, the next data record on tape B, $T_1D_1$, is read (block 141), as is the next data record on tape A (block 142), which is $T_2D_1$. The current merged data record is calculated by the computer (block 143), and the merged data record is written on tape B (block 144). Again, the writing operation is conventionally done one standard record gap after the previously read record on tape B, and the safety record gaps accordingly fall into place in the manner described in conjunction with FIG. 4. The decision block 145 determines whether the last data record has been reached, e.g. by sensing an "end of file" indication, and, if not, the loop 140 continues as each pair of related data records is processed in the manner described. When the last data record has been reached the tape B is again rewound (block 131), the pass number is tested (block 132) and the iterative technique continues until the last pass whereupon $n=N$ and the decision block 132 signifies the end of the routine.

In FIG. 5 it is assumed, for ease of illustration, that the number of data records on each section (tape 1, tape 2, etc.) of tape A has the same number of related data records. Provision can readily be made for the case where the tapes have different numbers of data records. For example decision block 145 could determine whether the last data record reached is on tape A or tape B or both. If both, the routine proceeds as shown. If on tape B (only), the loop 120 is reentered and dummy data records are caused to alternate with "extra" data records on tape B (as in pass-1) until the last data record on the particular section of tape A is reached. If it is the last data record on tape A, operation in loop 140 is continued, with the data records on tape B being alternately read and written as the current merged data records until the end of tape B has been reached.

Figure 6:
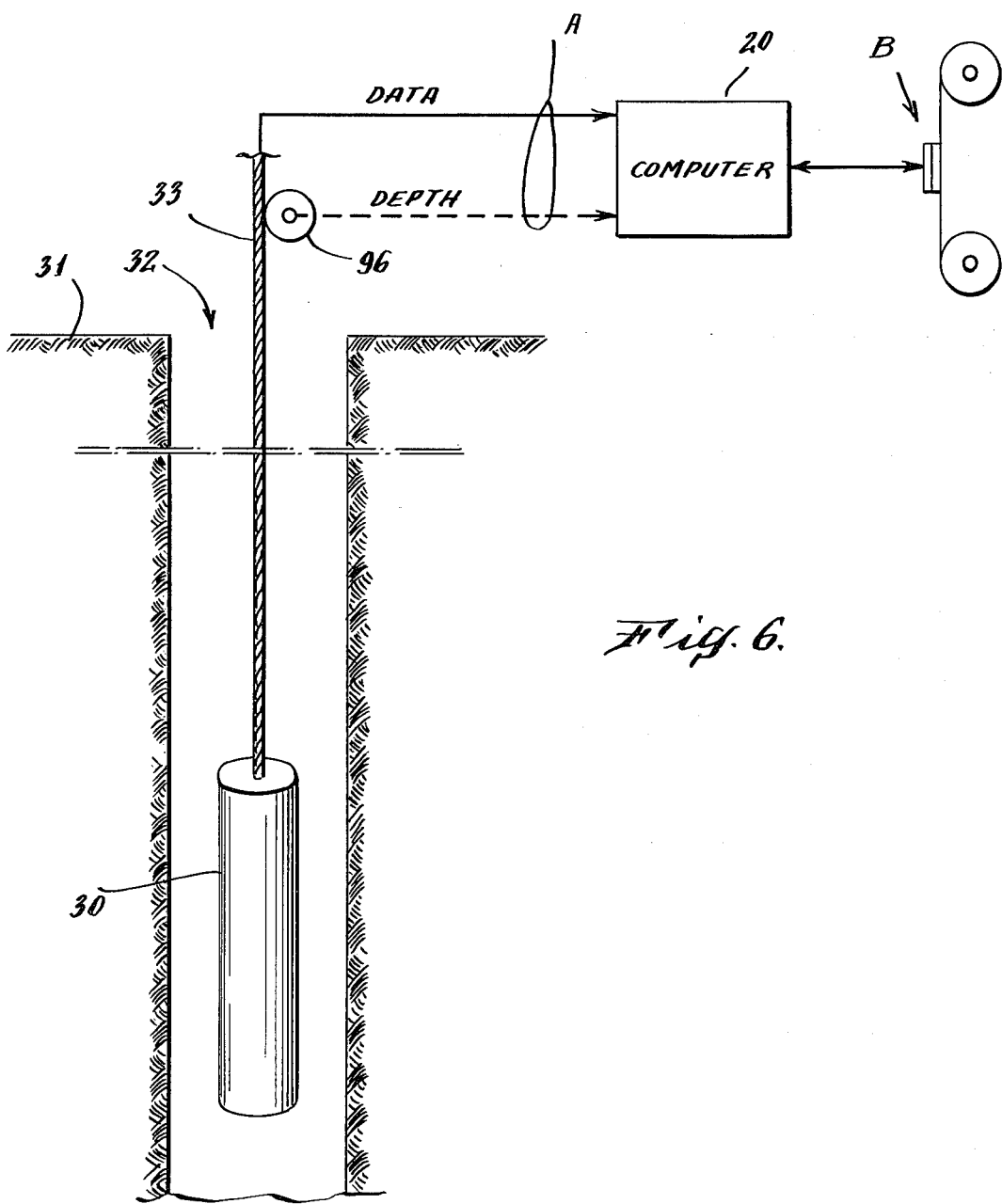
FIG. 6 shows a setup which can be utilized for practicing the method of the second embodiment of the invention.

In accordance with a second embodiment of the invention, the merging operation can be performed using only a single tape transport, such as in situations where the data records to be merged are not obtained from storage tape but rather, for example, on a "real time" basis. One instance of such a situation is where data records are obtained at a well logging site (or communicated from a well logging site), the data records being taken over a particular range of depth levels. The second embodiment can be initially visualized by recalling the description in conjunction with FIGS. 4 and 5 wherein the source of "new" data records to be merged was the formulated master tape A which was mounted on tape drive A (FIG. 2). Consider the situation where the information that had been read from tape A is instead obtained, without prerecording on storage tape, in substantially "real time", such as from a well logging device. The embodiment of FIG. 6 includes a single tape drive, labeled B, and a computer 20 (as in FIG. 2). In this case, however, the information which had been obtained from tape drive A in FIG. 2 is instead obtained directly from a well logging device 30 which is suspended in a borehole 32 on a cable 33 to investigate subsurface formations 31 traversed by the borehole. Typically, the cable length is controlled by suitable means at the surface, such as a drum and winch mechanism (not shown). A wheel 96 is coupled to the cable 33 and rotates in synchronism with the cable motion so as to provide an indication of the depth of logging device 30, such as by employing a shaft encoder (not shown). Depth information as well as data records taken at different depth levels over the range of interest are input to computer 20 and collectively referred to as the information "A". In terms of the description previously set forth in conjunction with FIG. 4, sequences of data records obtained during successive passes by the logging device 30 over the depth range of interest can be thought of as being equivalent to the data records recorded on the different sections of tape A in FIG. 2 and used during the different passes (pass 1, pass 2 . . . pass n) in FIG. 4.

FIG. 7 is a simplified flow diagram for use in implementing a digital computer to perform at least part of the method in accordance with this second embodiment of the invention. Again, it will be understood, that activation of the tape drive and/or performance of other steps in accordance with the invented method need not be performed using a general purpose or special purpose computer although such machines are most convenient for practicing the invention. The block 201 represents entrance into the "merge" routine, and application of tape labels, etc. which were described in conjunction with FIG. 5A, can also be implemented, if desired. The operator sets the index n, which represents the pass number of the device 30 over the depth level range of interest. If n equals 1, the loop indicated by arrow 220 is entered, and this loop achieves the alternating dummy records and data records illustrated in pass 1 of FIG. 4 in a manner similar to that described in conjunction with FIG. 5. In particular, blocks 221, 223 and 224 perform the same functions as the corresponding blocks 121, 122 and 124 of FIG. 5B. However, in this case, the block 222 represents the reading and storing of the next data record from the borehole, identified as information A. The procedure is continued until the last data record of the first sequence of data records is reached, whereupon block 231 is entered and tape B is rewound. The decision diamond 232 determines if the last pass has been performed. If not, block 206 is reentered and the operator sets the index n to its next value. Typically, at this time, the logging device 30 could be again lowered in the borehole for the next pass over the depth level range of interest.

During the processing or subsequent passes, the loop 240 is entered, this loop being used to perform the merging and writing operations for the remaining passes. The blocks 241, 243, 244 and 245 each operate in a similar manner to their counterparts 141, 143, 144 and 145 in FIG. 5B, with the block 242 now representing the reading of the next data record in a sequence from the borehole (information A). The decision block 245 determines whether the last data record of the sequence has been reached, e.g. by sensing an "end of file" indication, and, if not, the loop 240 continues. When the last data record has been reached, tape B is again rewound (block 231), the pass number is tested (block 232) and the described technique continues until the final pass, whereupon decision diamond 232 signifies the end of the routine. It can be noted that the writing of merged data records can be performed, depending upon the capabilities of the available equipment, at the same time that the next data record is being received from the logging device. The amount of available time between successive data records of a sequence may vary in different applications, and suitable buffers can be employed.

The invention has been described with reference to particular embodiments, but variations within the spirit and scope of the invention will occur to those skilled in the art. For example, while individual specific tapes were used as a starting point for describing the first embodiment, it will be appreciated that sections of one or more tapes can be processed in accordance with the invention and the merged information can be written on sections of one or more tapes or other suitable media. It will be understood that the term "sequences" of data records is meant in the generic sense and not limited, for example, to successive depth levels of well logging data. Further, when a step of the present invention recites that information is read from two sources, it will be understood that the reading can be done simultaneously or with either reading operation performed first. Finally, it is intended that references to the "length" of dummy data records and inter-record gaps not be limited to a physical interpretation of length, but rather to data-carrying capability, since data density per unit of storage area can be varied, if desired.

I claim:

1. A method of merging and rewriting, on a given section of storage media, information contained in related data records recorded on a plurality of sections of storage media, comprising the steps of:
   (a) reading the data records recorded on the first of said plurality of sections of storage media and sequentially rewriting said data records in alternating relationship with dummy data records on said given section of storage media;
   (b) reading related data records respectively recorded on the next of said plurality of sections of storage media and said given section of storage media, and merging the information therein;
   (c) writing the merged information onto the dummy data records on said given section of storage media to obtain current merged data records therein;
   (d) reading related data records recorded on the next of said plurality of sections of storage media and in the last-recorded merged data records on said given storage media, respectively, and merging the information therein;
   (e) writing the latest merged information onto said given section of storage media as current merged data records, said current merged data records occupying the alternate positions between the last-recorded merged data records; and
   (f) repeating steps (d) and (e) for each remaining of the plurality of sections of storage media.

2. The method as defined by claim 1 wherein the pairs of steps (b), (c) and (d), (e) are performed sequentially for each related pair of data records in the sections of storage media under consideration.

3. The method as defined by claim 2 wherein inter-record gaps are provided between adjacent written records and wherein the dummy data records of step (a) are made of sufficient length to hold the merged information for a pair of related data records plus an additional safety gap length.

4. The method as defined by claim 3 wherein the current merged data records are written beginning only one inter-record gap after each last-recorded merged data record; whereby an additional safety gap appears after each current merged data record.

5. A method of merging, and non-destructively rewriting on a given section of storage tape mounted on a first tape drive subsystem, information contained in related data records recorded on a plurality of sections of storage tape mountable on a second tape driven subsystem, said method requiring the use of only two tape drive subsystems, comprising the steps of:
- (a) reading the data records recorded on the first of said plurality of sections of storage tape and sequentially rewriting said data records in alternating relationship with dummy data records on said given section of storage tape;
- (b) rewinding said given section of storage tape;
- (c) reading a pair of related data records respectively recorded on the next of said plurality of sections of storage tape and said given section of storage tape and merging the information therein;
- (d) writing the merged information onto a dummy data record on said given section of storage tape to obtain a current merged data record therein;
- (e) repeating steps (c) and (d) for other pairs of related data records;
- (f) rewinding said given section of storage tape;
- (g) reading a pair of related data records recorded on the next of said plurality of sections of storage tape and in the last-recorded merged data records on said given section of storage tape, respectively, and merging the information therein;
- (h) writing the latest merged information onto said given section of storage tape as a current merged data record, said current merged data record occupying a position between last-recorded merged data records;
- (i) repeating steps (g) and (h) for other pairs of related data records; and
- (j) repeating steps (f) through (i) for each remaining of the plurality of sections of storage tape.

6. The method as defined by claim 5 wherein inter-record gaps are provided between adjacent written records and wherein the dummy data records of step (a) are made of sufficient length to hold the merged information for a pair of related data records plus an additional safety gap length.

7. The method as defined by claim 6 wherein the current merged data records are written beginning only one inter-record gap after each last-recorded merged data record; whereby an additional safety gap appears after each current merged data record.

8. A method of merging and writing on storage media information contained in related data records from a plurality of sequences of data records, comprising the steps of:
- (a) reading the data records of a first of said plurality of sequences and writing said data records in alternating relationship with dummy data records on said storage media;
- (b) reading related data records from the next of said plurality of sequences and from said storage media, respectively, and merging the information therein;
- (c) writing the merged information onto the dummy data records on said storage media to obtain current merged data records therein;
- (d) reading related data records from the next of said plurality of sequences and from the last-recorded merged data records, respectively, and merging the information therein;
- (e) writing the latest merged information onto said storage media as current merged data records, said current merged data records occupying the alternate positions between the last-recorded merged data records; and
- (f) repeating steps (b) and (e) for each remaining of the plurality of sequences of data records.

9. The method as defined by claim 8 wherein the pairs of steps (b), (c) and (d), (e) are performed sequentially for each related pair of data records in said sequences.

10. The method as defined by claim 9 wherein inter-record gaps are provided between adjacent written records and wherein the dummy data records of step (a) are made of sufficient length to hold the merged information for a pair of related data records plus an additional safety gap length.

11. The method as defined by claim 10 wherein the current merged data records are written beginning only one inter-record gap after each last-recorded merged data record; whereby an additional safety gap appears after each current merged data record.

12. A method of merging and writing on storage tape information contained in related data records from a plurality of sequences of data records, said method requiring the use of only a single tape drive subsystem, comprising the steps of:
- (a) reading the data records from a first of said plurality of sequences and writing said data records in alternating relationship with dummy data records on said storage tape;
- (b) rewinding said storage tape;
- (c) reading a pair of related data records from the next of said plurality of sequences and from said storage tape, respectively, and merging the information therein;
- (d) writing the merged information onto a dummy data record on said storage tape to obtain a current merged data record therein;
- (e) repeating steps (c) and (d) for other pairs of related data records;
- (f) rewinding said storage tape;
- (g) reading a pair of related data records from the next of said plurality of sequences and from the last-recorded merged data records on said storage tape, respectively, and merging the information therein;
- (h) writing the latest merged information onto said storage tape as a current merged data record, said current merged data record occupying a position between last-recorded merged data records;
- (i) repeating steps (g) and (h) for other pairs of related data records; and
- (j) repeating steps (f) through (i) for each remaining of the plurality of sequences.

13. The method as defined by claim 12 wherein inter-record gaps are provided between adjacent written records and wherein the dummy data records of step (a) are made of sufficient length to hold the merged information for a pair of related data records plus an additional safety gap length.

14. The method as defined by claim 13 wherein the current merged data records are written beginning only one inter-record gap after each last-recorded merged data record; whereby an additional safety gap appears after each current merged data record.

* * * * *